United States Patent
Molinaro et al.

(10) Patent No.: US 12,221,083 B2
(45) Date of Patent: Feb. 11, 2025

(54) REDUCTION MOTOR FOR DRUM BRAKE

(71) Applicant: HITACHI ASTEMO FRANCE, Drancy (FR)

(72) Inventors: Alberto Molinaro, Noisy le Grand (FR); Cédric Guignon, La Queue en Brie (FR); Gérard Luu, Noisy le Grand (FR); Christophe Dupas, Pornic (FR); Gaëtan Quazuguel, Pantin (FR)

(73) Assignee: HITACHI ASTEMO FRANCE, Drancy (FR)

( * ) Notice: Subject to any disclaimer, the term of this patent is extended or adjusted under 35 U.S.C. 154(b) by 566 days.

(21) Appl. No.: 17/417,661

(22) PCT Filed: Dec. 18, 2019

(86) PCT No.: PCT/FR2019/053158
§ 371 (c)(1),
(2) Date: Jun. 23, 2021

(87) PCT Pub. No.: WO2020/136325
PCT Pub. Date: Jul. 2, 2020

(65) Prior Publication Data
US 2022/0055595 A1 Feb. 24, 2022

(30) Foreign Application Priority Data
Dec. 28, 2018 (FR) ........................................ 1874365

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/067* (2013.01); *F16D 65/22* (2013.01); *F16H 1/203* (2013.01);
(Continued)

(58) Field of Classification Search
CPC ........ B60T 13/746; B60T 1/067; F16D 65/22; F16D 51/20; F16D 2121/24; F16D 2125/48; F16D 2125/52; F16H 1/203
(Continued)

(56) References Cited

U.S. PATENT DOCUMENTS

| 5,275,260 | A | * | 1/1994 | Evans | ..................... | F16D 65/08 |
| | | | | | | 188/79.64 |
| 6,536,561 | B1 | * | 3/2003 | Keller | ..................... | H02K 7/06 |
| | | | | | | 188/162 |

(Continued)

FOREIGN PATENT DOCUMENTS

| EP | 0632213 B1 | 8/1997 |
| FR | 2400793 A1 | 3/1979 |

(Continued)

OTHER PUBLICATIONS

International Search Report issued in Application No. PCT/FR2019/053158, dated May 29, 2020.

(Continued)

*Primary Examiner* — Christopher P Schwartz
(74) *Attorney, Agent, or Firm* — McDonald Hopkins LLC

(57) ABSTRACT

A reduction motor for a parking brake mechanical actuator of a drum brake comprising an electric motor and a reduction gearbox, in which the electric motor comprises an output shaft extending along a first axis, the reduction gearbox comprises an output shaft extending along a second axis, and in which the reduction motor also comprises at least one angle gear between the electric motor and the reduction gearbox or at the output of the reduction gearbox, the angle gear comprising a crown gear-pair comprising a pinion and a crown gear, the pinion being engaged with the output shaft of the electric motor and meshing with the crown gear which is a part of the reduction gearbox.

19 Claims, 4 Drawing Sheets

(51) Int. Cl.
  *F16D 65/22* (2006.01)
  *F16H 1/20* (2006.01)
  *F16D 51/20* (2006.01)
  *F16D 121/24* (2012.01)
  *F16D 125/48* (2012.01)
  *F16D 125/52* (2012.01)

(52) U.S. Cl.
  CPC .......... *F16D 51/20* (2013.01); *F16D 2121/24* (2013.01); *F16D 2125/48* (2013.01); *F16D 2125/52* (2013.01)

(58) Field of Classification Search
  USPC .................................. 188/156, 158, 325–327
  See application file for complete search history.

(56) References Cited

U.S. PATENT DOCUMENTS

| | | | | |
|---|---|---|---|---|
| 9,188,182 | B2 * | 11/2015 | Park | F16H 48/08 |
| 11,060,572 | B2 * | 7/2021 | Barbosa | F16D 51/22 |
| 2015/0041261 | A1 * | 2/2015 | Masuda | F16D 66/00 188/163 |
| 2018/0058525 | A1 * | 3/2018 | Kasper | F16D 51/28 |
| 2022/0063579 | A1 * | 3/2022 | Molinaro | F16D 65/22 |

FOREIGN PATENT DOCUMENTS

| | | |
|---|---|---|
| FR | 3016011 A1 | 7/2015 |
| FR | 3016015 A1 | 7/2015 |
| JP | 2017502230 A | 1/2017 |
| KR | 20110011038 A | 2/2011 |
| WO | 2018/148245 A1 | 8/2018 |

OTHER PUBLICATIONS

Written Opinion issued in Application No. PCT/FR2019/053158, dated May 29, 2020.
Preliminary French Sear Report for French application No. FR3016015 , dated Oct. 1, 2019.
Office action for Patent Application No. JP2021-536817 dated Oct. 19, 2023.
First Office Action issued on May 27, 2024 in Chinese Patent Application No. 2024052701808560.

* cited by examiner

REDUCTION MOTOR FOR DRUM BRAKE

CROSS-REFERENCE TO RELATED APPLICATIONS

This is a National Stage of PCT international application PCT/FR2019/053158, filed on Dec. 18, 2019, which claims the priority of French Patent Application No. 1874365, filed Dec. 28, 2018, both of which are incorporated herein by reference in their entirety.

FIELD OF TECHNOLOGY AND STATE OF THE ART

The present invention is concerned with the field of automobile vehicle brakes, and more specifically with a geared motor assembly for operating the shoes of a drum brake, offering a reduced overall size.

In the automobile industry, the function of the electromechanical parking brake is to bring the stationary vehicle to a standstill in order to prevent it from moving unexpectedly. It furthermore fulfils the legal requirement for a second braking system independent of the generally hydraulic, service braking system, in the vehicle and fulfils other comfort and safety functions, especially through its self-diagnostic capability.

It is known from document FR3016015 that a mechanical actuator can be installed in a drum brake in addition to the hydraulic actuator initially provided. Such a drum brake, marked by 1 in FIG. 1, comprises a backing plate 2 of revolution about axis AX equipped with a first and a second arc-shaped shoe 3 and 4 which are radially movable so that they can be pressed against the cylindrical inner face of a drum not represented.

The shoes 3 and 4 each have a web 3a, 4a made of flat sheet metal in the form of a circular ring portion which carries a brake lining 3b, 4b, and are diametrically oppositely mounted with their ends bearing on both a hydraulic wheel cylinder 6 and a mechanical actuator 7 carried by the backing plate 2. These shoes 3 and 4 are further biased towards each other by two return springs 8 and 9, and pressed against the backing plate 2 each by a spring 10, 11.

A wear take-up rod 12 extends along the wheel cylinder 6, having a first end bearing on the web 3a of the first shoe 3 and a second end bearing on the web 4a of the second shoe 4.

The wheel cylinder 6 is to be actuated upon using the drum brake 1 according to a first operating mode known as "simplex", which provides progressive braking particularly adapted for braking the vehicle in service. It comprises a hydraulic chamber closed at its ends by two pistons which move apart when the hydraulic pressure increases and pushes the associated ends of shoes 3 and 4.

The mechanical actuator 7 in turn provides parking and emergency braking by moving the associated ends of the shoes apart to provide rapid and powerful locking of the vehicle's wheels according to a so-called "duo-servo" operating mode, especially when the wheel cylinder 6 is inactive. This actuator is driven by an electric motor 21 with axis AY.

In practice, one of the difficulties associated with the use of a mechanical actuator lies in the need to convert a high rotational speed associated with a low torque of the electric motor, into a low displacement with sufficient load. To this end, document FR3016015 teaches to provide a reduction module that transmits a rotation of the motor 21, more precisely a rotation of an axis AY motor pinion driven directly by this motor, to the mechanical actuator 7. This reduction module is centred on the axis AY and comprises several steps of axis AY planetary gear trains in order to provide an effective speed reduction between its output measured at an axis AY output gear coupling to the mechanical actuator 7 and its input measured at the motor pinion. Furthermore, the motor 21 and the reduction module are housed together in a cylindrical housing.

Such an architecture of geared motor, that is the combination of the motor 21 and the reduction module, requires the axis of the motor to be arranged in parallel to the axes of the planetary gear trains, and the axis of the reduction module to be arranged in parallel to the axes of the toothed wheels of the mechanical actuator 7. The arrangement of the motor in relation to the reduction module is therefore set, as is the orientation of the geared motor in relation to the drum brake plate.

Yet, it is desirable to be able to make a geared motor the architecture of which can be adapted to different configurations of available space at the wheels. Furthermore, the geared motor of the state of the art is of large overall size.

DISCLOSURE OF THE INVENTION

It is therefore a purpose of the present invention to provide a geared motor, for example for actuating a parking brake of a drum brake, which can be easily adapted to different configurations at the wheels.

The purpose set out above is achieved by a geared motor including at least one angle transmission formed by a crown gear.

On the one hand, the implementation of an angle transmission offers greater freedom in the configuration of the geared motor and/or in its orientation with respect to the mechanical actuator of the drum brake. On the other hand, the implementation of an angle transmission with a crown gear offers much liberty in choosing the orientation of the output axis of the motor relative to the reduction gearbox.

Furthermore, within the crown gear, the meshing position of the teeth of the pinion relative to the teeth of the crown gear can vary without modifying the operation of the angle transmission, providing additional freedom in the configuration of the geared motor.

The geared motor can advantageously have a reduced overall size.

Very advantageously, an angle transmission with a crown gear connects the motor and the reduction gearbox. For example, a pinion is attached to the output shaft of the electric motor and meshes with a crown gear forming part of the reduction gearbox. For example, a pinion is arranged coaxially to the crown gear and is rotatably integral with it, and drives a toothed wheel of the reduction gearbox.

Advantageously, an angle transmission connects the output of the reduction gearbox and the parking brake actuator and includes a crown gear.

Preferably the reduction gearbox includes an externally contacting stepped gear train, each including a pinion and a toothed wheel which are juxtaposed, in each stepped gear the pinion and the toothed wheel are coaxial, superimposed rotatably integral with each other, the pinion of one gear meshing with the toothed wheel of an adjacent stepped gear.

Making such a reduction gearbox offers additional freedom in the configuration of the geared motor.

It is therefore one subject-matter of the present invention to provide a geared motor for a mechanical parking brake actuator of a drum brake including an electric motor and a reduction gearbox, the electric motor including an output shaft extending along a first axis, and the reduction gearbox comprising an output axis extending along a second axis. The geared motor also includes at least one angle transmission between the electric motor and the reduction gearbox or at the output of the reduction gearbox, said angle transmission comprising a crown gear.

Advantageously, the angle transmission includes a pinion and a crown gear, the pinion being engaged with the output shaft of the electric motor and meshing with the crown gear which is part of the reduction gearbox.

The crown gear may be rotatably integral with a pinion and form a stepped gear with it.

The angle transmission can include a pinion for meshing with a toothed wheel of the mechanical actuator of the drum brake, the pinion forming a ring gear carried by a face of a toothed wheel, the ring gear and the toothed wheel forming a stepped gear.

Advantageously, the geared motor include a first angle transmission and a second angle transmission, the first angle transmission including a pinion and a crown gear, the pinion being engaged with the output shaft of the electric motor and meshing with the crown gear, which is part of the reduction gearbox, and the second angle transmission including a pinion for meshing with a toothed wheel of the mechanical actuator of the drum brake, the pinion forming a ring gear carried by a face of a toothed wheel, the ring gear and the toothed wheel forming a stepped gear.

For example, the reduction gearbox includes one or more stepped gears each including a toothed wheel and a pinion, the toothed wheel and the pinion being coaxial, for example between four and six stepped gears.

Advantageously, the axes of the stepped gears are orthogonal to the first axis of the electric motor.

The first axis and the second axis are advantageously intersecting.

Another subject-matter of the present invention is a drum brake including a drum, a backing plate, two shoes, and a mechanical actuator attached to the backing plate for parking braking and a geared motor according to the invention.

Preferably, the axes of the stepped gears are parallel to the axis of the drum.

The reduction gearbox can include a housing with two parallel planar faces extending in parallel to the brake backing plate.

BRIEF DESCRIPTION OF THE DRAWINGS

The present invention will be better understood using the following description and the appended drawings in which.

DETAILED DISCLOSURE OF PARTICULAR EMBODIMENTS

Figure 1:
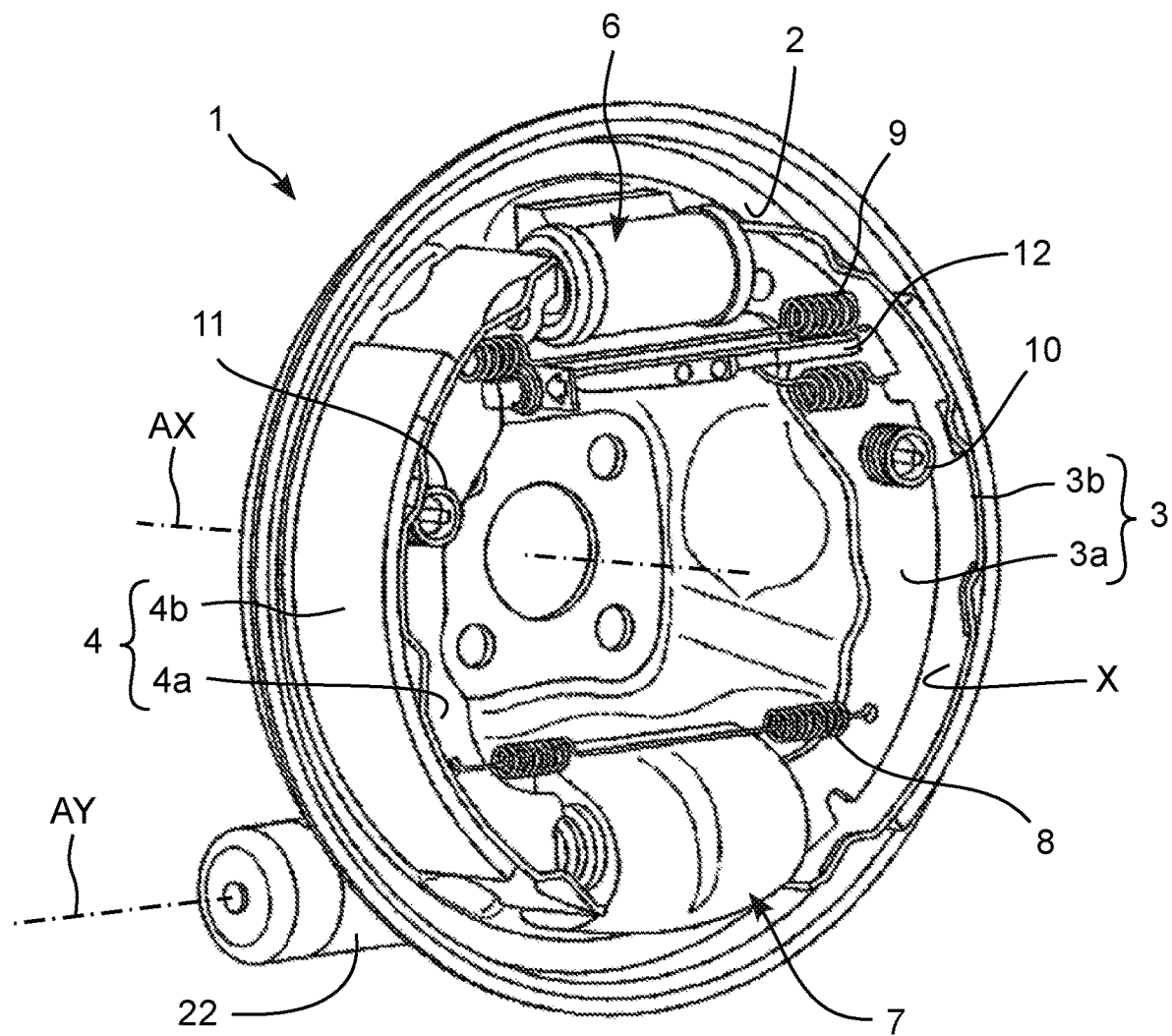
FIG. 1 is a perspective view of a drum brake with electric parking brake actuator according to the state of the art.
Figure 2:
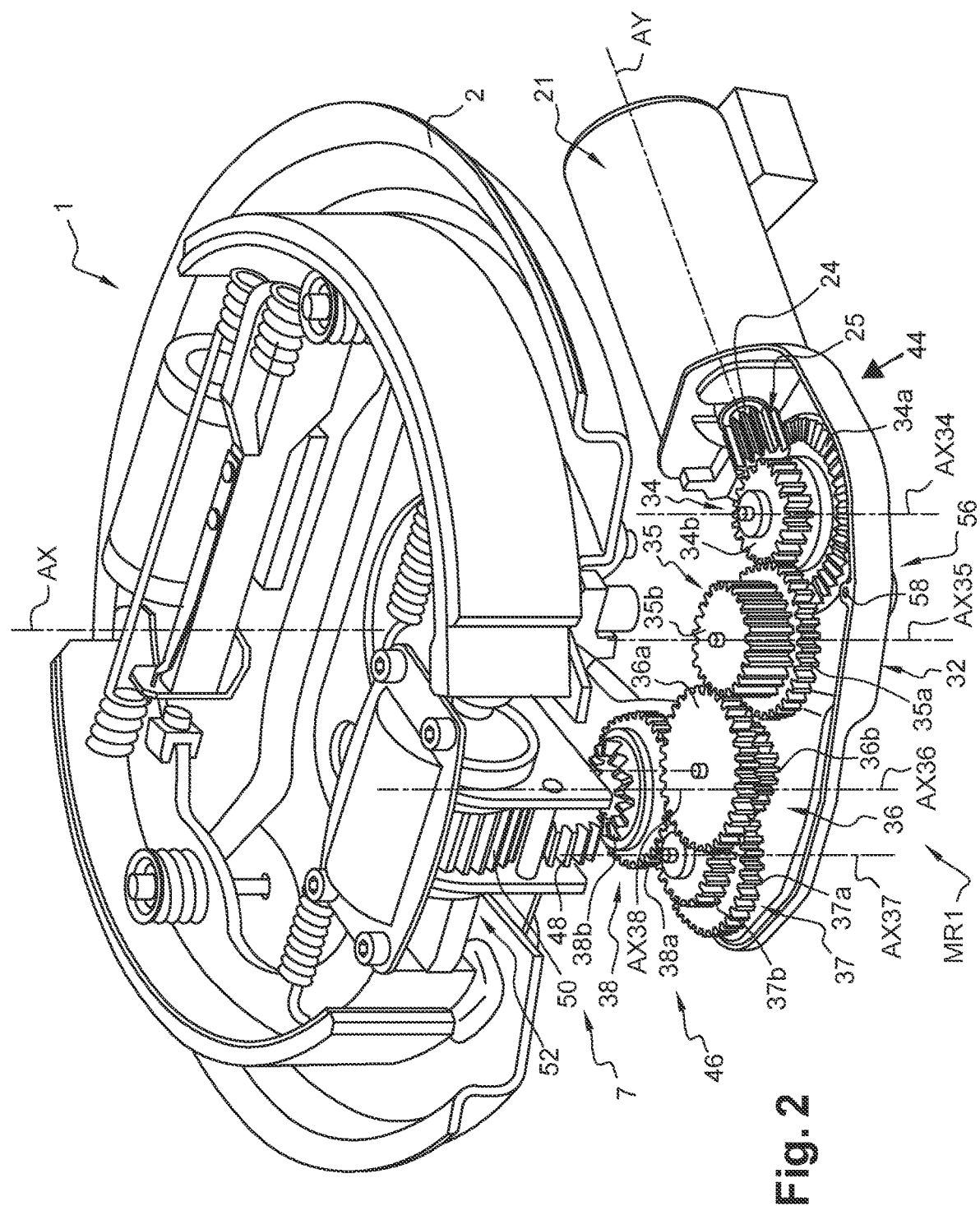
FIG. 2 is a perspective view of a drum brake fitted with a geared motor according to one exemplary embodiment of the present invention, the drum and the cover of the geared motor housing not being represented.

In FIG. 2, a perspective view of one advantageous example of a geared motor MR1 according to the invention associated with a drum brake 1 comprising an electric parking brake actuator 7 can be seen.

The geared motor MR1 includes an electric motor 21 and a transmission module or reduction gearbox 32.

In the example represented, the electric motor 21 and its output shaft 24 extend along axis AY and the output axis of the transmission module extends along an axis AZ orthogonal to axes AY and AZ.

In this example, the transmission module is intended to extend in parallel to the backing plate 2.

In the example represented, advantageously, the kinematic chain of the transmission module is in the form of a so-called compound reduction in which the gear elements are in the form of a linear train of externally contacting stepped gears, preferably four to six in number. In the example of FIG. 2, there are five stepped gears 34, 35, 36, 37 and 38.

The stepped gears 34, 35, 36 and 37 respectively comprise a first step in the form of a toothed wheel 34a, 35a, 36a, 37a and a second step in the form of a pinion 34b, 35b, 36b, 37b rigidly connected to the corresponding toothed wheel with a smaller diameter than the latter. The gear 38 comprises a toothed wheel 38a and a ring gear 38b.

The stepped gears 34, 35, 36, 37 and 38 are each arranged to be rotatably mounted about a distinct fixed axis AX34, AX35, AX36, AX37 and AX38, each of these axes being parallel to each other and arranged in that order along the direction of reduction, i.e. from the motor pinion to the mechanical actuator 7. They are especially dimensioned so that the pinion forming the output of one gear meshes with the toothed wheel of the next gear, with the toothed wheel 34a forming the input element of the kinematic chain, while the pinion 38b forms the output element of this chain.

Alternatively, the transmission module includes pinions and single toothed wheels or single pinions and toothed wheels and stepped pinions. Their number and the number of teeth of each of them are set by the desired reduction.

Furthermore, the geared motor MR1 has a first angle transmission 44 connecting the motor 21 and the transmission module 32 and a second angle transmission 46 connecting the output of the transmission module and the actuator 7.

The first angle transmission 44 is advantageously of the crown gear type and comprises a pinion 25 and a crown gear 34a, the pinion 25 meshing with the crown gear 34a. The pinion 25 is engaged with the output shaft 24 of the electric motor 21.

Figure 3:
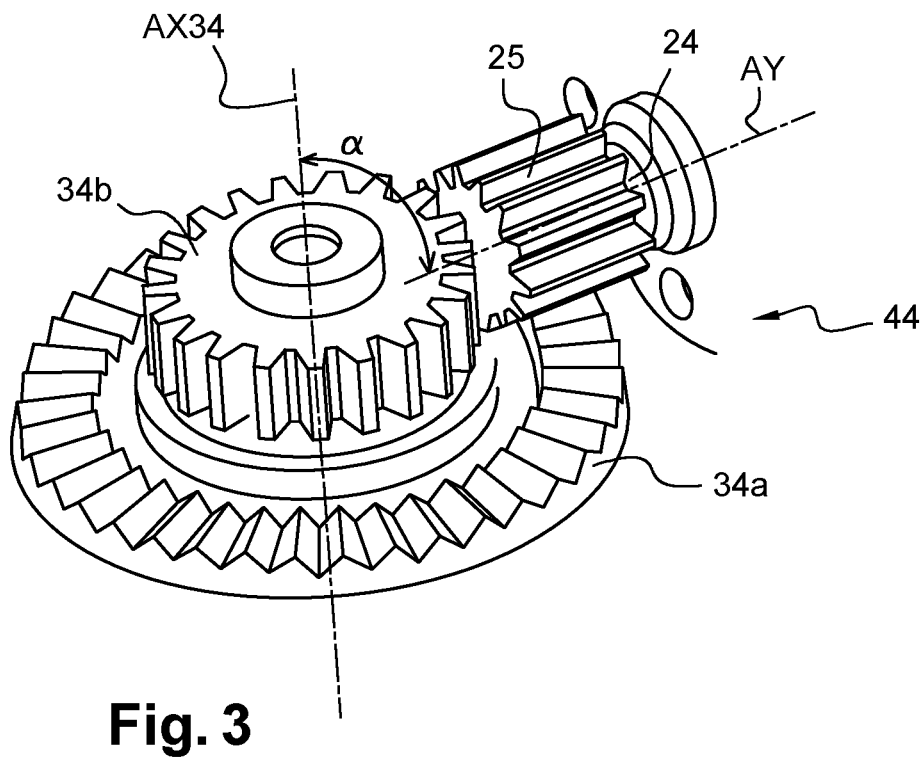
FIG. 3 is a detail view of FIG. 2 at the angle transmission at the motor output.

The crown gear 34a has a wheel with teeth formed in a ring on one side of the wheel. In FIG. 3, the crown gear is represented alone.

The angle transmission with a crown gear offers the advantage of offering freedom in orienting the axis of the pinion 25 with respect to the axis of the toothed wheel 34a, i.e. a great freedom in selecting the angle of the angle transmission. Indeed, the angle α between the AX34-axis and the axis AY can vary from 30° to 135°. This gives a wide choice of orientations between the motor and the transmission module, to adapt the shape of the geared motor to that of the available space. Further, requirements on mounting accuracy are reduced.

Figure 4:
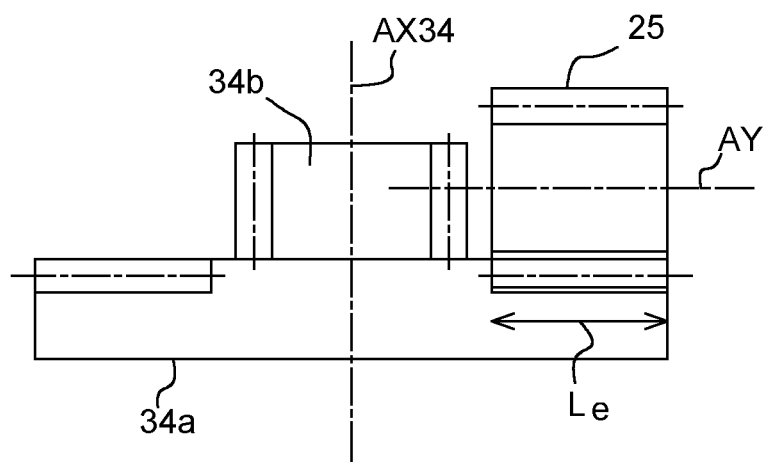
FIG. 4 is a side view of the angle transmission of FIG. 3.

In addition, the position of the teeth of the pinion 25 relative to the teeth of the toothed wheel 34a can vary. In FIG. 4, the length of meshing Le corresponds to the length of the zone where the teeth of the pinion engage the teeth of the toothed wheel 34a. The pinion 25 can be arranged with respect to the toothed wheel with a clearance j. The clearance j is between +/−1/100 mm and +/−10 mm, advantageously between +/−1/10 mm and +/−5 mm, preferably between +/−1 mm and +/−3 mm and even more preferably between +/−2 mm.

This assembly clearance allowed by the crown gear contributes to offering greater freedom in the arrangement of the various elements of the geared motor. The requirements of mounting accuracy are also more relaxed.

In addition, an angle transmission with a crown gear offers an efficiency of 97% to 99%. In comparison, the efficiency of an angle transmission with a bevel gear is about 30% lower than that of an angle transmission with a crown gear.

Advantageously, in the example represented, the second angle transmission also has a crown gear. The toothed wheel 38a, which is driven by the pinion 37b, carries on one of its faces, the upper face in the representation of FIG. 2, the pinion 38b which meshes with a toothed wheel 48 of a transmission gear 52 which transmits the rotation of the geared motor to the actuator 7. The transmission gear 52 includes wheels 48, 50 with parallel axes.

The pinion 38b includes a ring gear. The pinion 38b and the toothed wheel 48 form the crown gear of the second angle transmission of the actuator.

In the example represented, the transmission gear 55 includes the toothed wheel 48 and a toothed wheel 52, which causes pistons bearing on the ends of the brake shoes to be moved apart and moves them apart towards the drum.

Alternatively, the geared motor includes an angle transmission with a crown gear and a conical angle transmission.

Figure 5:
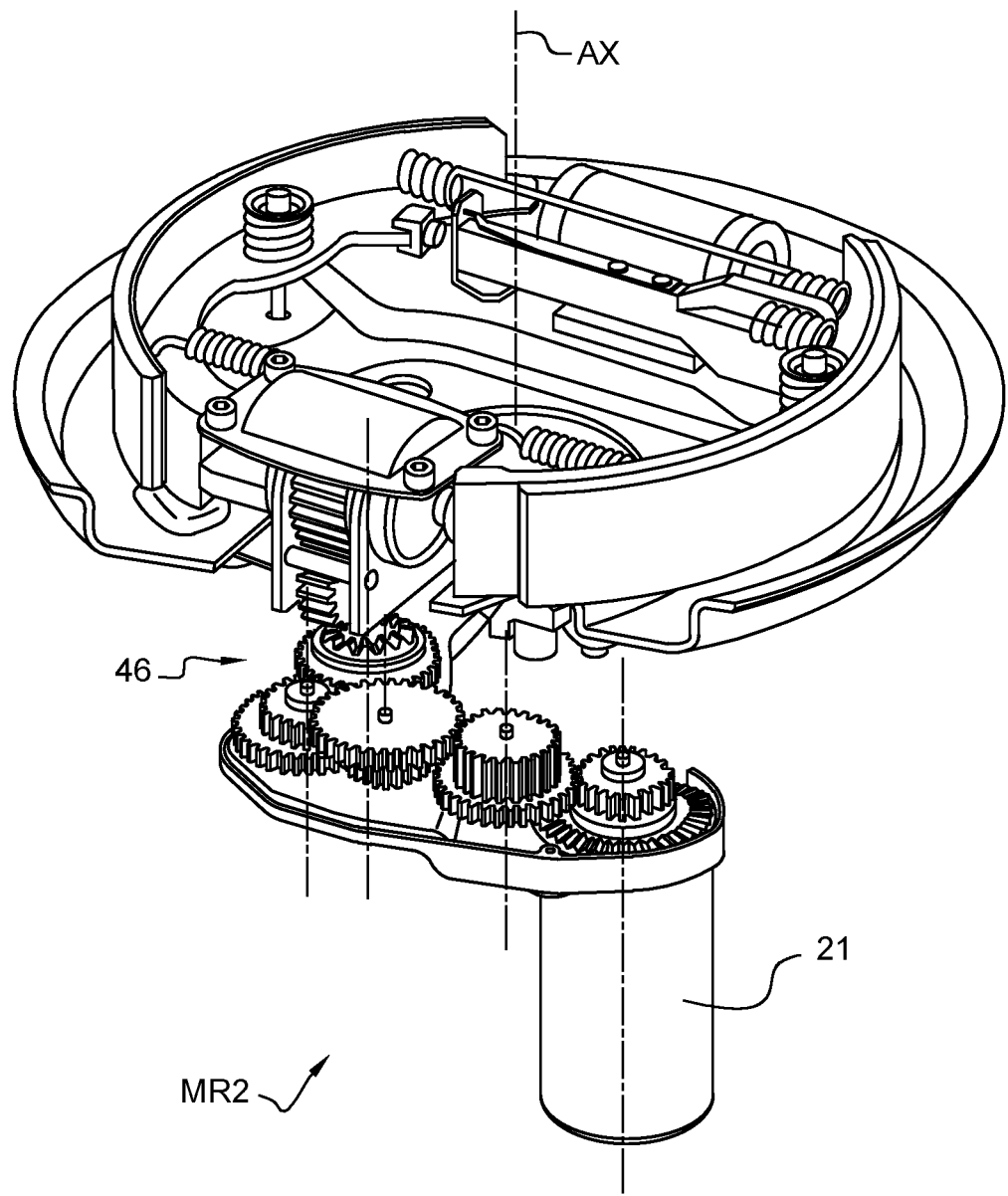
FIG. 5 is a perspective view of the mounting of a drum brake with a geared motor according to an exemplary embodiment of the present invention and drum brake on a vehicle chassis, with the drum and the cover of the housing omitted.

In FIG. 5, another example of geared motors MR2 according to the invention including an angle transmission 46 at the output only can be seen. In this example, the output shaft of the electric motor drives the toothed wheel 34a directly. The reduction of each meshed toothed wheel/pinion pair is adapted so that the total reduction is as expected. Indeed, in this example one reduction step is removed relative to the example in FIG. 2.

In another example not represented, the toothed wheel at the output directly meshes with the toothed wheel teeth of the actuator. In this case, the axes of the stepped gears are orthogonal to the axes of the stepped gears in FIG. 2.

Furthermore, the implementation of a reduction gearbox in the form of a stepped gear train also offers a great deal of freedom in the form that the reduction gearbox can take. The relative arrangement of the axes of the stepped gears is free, with only the distances between the axes being set to ensure tangential meshing of a pinion and a toothed wheel. As a result, the gear train can have a more or less extended shape and thus be adapted to the available environment around the wheel. For example, the gear train can have a curved form or S-shaped form.

Advantageously, the shafts are integral with a plate 53 which is mounted in the bottom of a housing 54 housing the gear train. For example, they are made in one piece with the plate 53 by moulding, or they are made of a metal material and are overmoulded in a plate of plastic material.

The housing 54 is advantageously configured to follow the contours of the gears as closely as possible in order to further reduce the overall size of the geared motor.

In the example represented, the housing includes two parts, a first part 54.2 including the bottom on which the plate 53 carrying the axes of the stepped gears rests and a second part (not shown) forming a cover.

Advantageously, the first and second parts include a flat bottom. Alternatively, the cover follows the contours of the gears.

The first and second parts may be symmetrical with respect to a plane passing through the junction zone between the first and second parts.

The housing is advantageously made by moulding plastic material.

Advantageously, the housing 54 includes means 56 for attaching the geared motor to the drum brake, more particularly to the backing plate in order to limit movements of the geared motor which could damage it and/or generate undesirable noise. For example, the means 56 for attaching the geared motor to the plate include screw holes 58 passing through the housing 54 in the X direction outside the gears and in which screws are to be mounted, which cooperate with corresponding openings provided in the plate.

REFERENCES

1: drum brake
2: backing plate
3: first shoe
4: second shoe
3a, 4a: brake webs
3b, 4b: brake linings
6: hydraulic wheel cylinder
7: mechanical actuator
8, 9: return springs
10, 11: lateral springs
12: wear take-up rod
21: electric motor
24: output shaft
25: pinion
32: reduction gearbox
34; 35, 36, 37, 38: stepped gears
34a, 35a, 36a, 37a, 38a: toothed wheels
34b, 35b, 3.6b, 37b, 38b: pinions
44: first angle transmission
46: second angle transmission
48: transmission gear
50, 52: toothed wheels of the transmission gear
53: plate
54: housing
54.1: first part of the housing
56: means for attaching the geared motor to the plate
58: screw holes
AX, AY: axes
AX34, AX35, AX36, AX37, AX38: axes of gears 34; 35, 36, 37, 38
Le: meshing length
MR1, MR2: geared motor

What is claimed is:

1. A geared motor for a mechanical parking brake actuator of a drum brake including an electric motor and a reduction gearbox, wherein the electric motor has an output shaft extending along a first axis, the reduction gearbox includes an output axis extending along a second axis, and wherein the geared motor also includes an angle transmission between the electric motor and the reduction gearbox or at the output of the reduction gearbox, said angle transmission comprising a crown gear and a straight-cut pinion or toothed wheel meshing with the crown gear.

2. The geared motor according to claim 1, wherein the reduction gearbox includes one or more stepped gears each including a toothed wheel and a pinion, the toothed wheel and the pinion being coaxial.

3. The geared motor according to claim 2, wherein the axes of the stepped gears are orthogonal to the first axis of the electric motor.

4. The geared motor according to claim 2, including four to six stepped gears.

5. The geared motor according to claim 1, wherein the angle transmission comprises the straight-cut pinion and the crown gear, the straight-cut pinion being engaged with the output shaft of the electric motor and meshing with the crown gear which is part of the reduction gearbox.

6. The geared motor according to claim 5, wherein the crown gear forms a stepped gear with the straight-cut pinion.

7. The geared motor according to claim 1, wherein the angle transmission includes a second pinion for meshing with a toothed wheel of a mechanical actuator of the drum brake, the second pinion forming a ring gear carried by a face of the toothed wheel, the ring gear and the toothed wheel forming a stepped gear.

8. The geared motor according to claim 1, further comprising a second angle transmission, wherein the angle transmission includes the straight-cut pinion and the crown gear, the straight-cut pinion being engaged with the output shaft of the electric motor and meshing with the crown gear which is part of the reduction gearbox, and wherein the second angle transmission includes a second pinion for meshing with a toothed wheel of a mechanical actuator of the drum brake, the second pinion forming a ring gear carried by a face of the toothed wheel of the mechanical actuator, the ring gear and the toothed wheel forming a stepped gear.

9. A drum brake including a drum, a backing plate, two shoes, and a mechanical actuator attached to the backing plate for parking braking, and a geared motor according to claim 1.

10. A geared motor for a mechanical parking brake actuator of a drum brake including an electric motor and a reduction gear, wherein the electric motor includes an output shaft extending along a first axis, the reduction gear includes an output axis extending along a second axis, and wherein the geared motor also includes an angle transmission between the electric motor and the reduction gear, said angle transmission comprising a crown gear and a straight-cut pinion or toothed wheel meshing with the crown gear.

11. The geared motor according to claim 10, wherein the angle transmission comprises the straight-cut pinion and the crown gear, the straight-cut pinion being engaged with the output shaft of the electric motor and meshing with the crown gear which is part of the reduction gearbox.

12. The geared motor according to claim 11, wherein the crown gear forms a stepped gear with the straight-cut pinion.

13. The geared motor according to claim 10, wherein the reduction gearbox includes one or more stepped gears each including a toothed wheel and a pinion, the toothed wheel and the pinion being coaxial.

14. The geared motor according to claim 13, wherein the axes of the stepped gears are orthogonal to the first axis of the electric motor.

15. The geared motor according to claim 10, wherein the first axis and the second axis are intersecting.

16. A drum brake including a drum, a backing plate, two shoes, and a mechanical actuator attached to the backing plate for parking braking, and a geared motor according to claim 10.

17. A geared motor for a mechanical parking brake actuator of a drum brake including an electric motor and a reduction gearbox, wherein the electric motor includes an output shaft extending along a first axis, the reduction gearbox includes an output axis extending along a second axis, and wherein the geared motor also includes at least one angle transmission at the output of the reduction gearbox, said angle transmission comprising a crown gear, a first pinion for meshing with a toothed wheel of the mechanical actuator of the drum brake, the first pinion forming a ring gear carried by a face of a toothed wheel, the ring gear and the toothed wheel forming a stepped gear.

18. The geared motor according to claim 17, wherein the reduction gearbox includes one or more stepped gears each including a toothed wheel and a second pinion, the toothed wheel and the second pinion being coaxial.

19. A geared motor for a mechanical parking brake actuator of a drum brake including an electric motor and a reduction gearbox, wherein the electric motor has an output shaft extending along a first axis, the reduction gearbox includes an output axis extending along a second axis, and wherein the geared motor also includes a first angle transmission between the electric motor and the reduction gearbox and a second angle transmission at the output of the reduction gearbox, said first angle transmission and said second angle transmission each comprising a crown gear.

* * * * *